June 19, 1945.  T. NELSON  2,378,720

CHUCK

Filed March 17, 1943

INVENTOR
TED NELSON
BY Charles S. Evans
HIS ATTORNEY

Patented June 19, 1945

2,378,720

UNITED STATES PATENT OFFICE 2,378,720

CHUCK

Ted Nelson, San Leandro, Calif.

Application March 17, 1943, Serial No. 479,459

1 Claim. (Cl. 279—41)

My invention relates to chucks and particularly to a chuck useful with stud welding machines.

One of the objects of the invention is the provision of a resilient jaw chuck in which the thin broad head of a stud may be readily seated and held while the stud is being welded.

Another object of the invention is the provision of a chuck for the purpose described which is readily shaped from a single piece of material.

My invention possesses other objects and features of value, some of which, with the foregoing, will be set forth in the following description of the invention. It is to be understood that I do not limit myself to the showing made by the said description and the drawing, as I may adopt variant forms of the invention within the scope of the appended claim.

In the drawing

Figure 1:
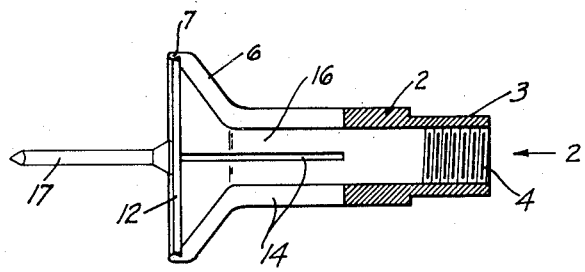
Figure 1 is a sectional view, the plane of section intersecting the axis of the chuck and stud and being indicated by the line 1—1 of Figure 2. A stud indicated in light lines is shown held in the chuck.
Figure 2:
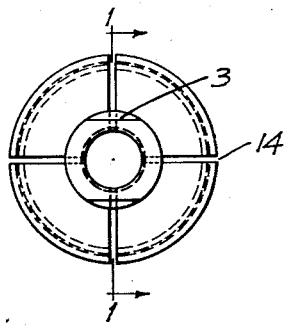
Figure 2 is an end elevation of the chuck, the direction of the view being shown by the arrow 2 of Figure 1.
Figure 3:
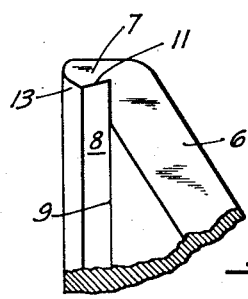
Figure 3 is a detail on an enlarged scale and showing in side elevation the upper portion of the chuck, shown in full in Figure 1.

In various forms of construction it has become a recent practice to secure sheets of insulation upon metal plates or walls by studs welded to the wall or plate and having thereon thin broad plates forming heads which retain the sheets in place. In some cases where the insulation is of dense material holes may first be drilled in the sheets through which the studs are passed to form contact with the metal backing plate. With many common types of thermal insulation, which are formed of matted or felted fibers, it has been found economical and rapid to make studs with points at one end and thin broad heads at the other, push these studs point first through the insulating sheets at the desired locations to engage the backing wall and then weld the end of the stud to the wall.

To facilitate the rapid handling and placing of the studs it is necessary to provide a chuck on the welding machine in which the stud may readily be mounted, held during a welding cycle and then disengaged. The present invention is intended to supply this need.

Referring now to the drawing, my chuck comprises a single piece, preferably tool steel, turned to provide a cylindrical hollow body including the shank 2, one end of which is milled to form two flats 3 to provide a wrench hold for the chuck so that it may be applied to or removed from a spindle threaded to engage the internal threads 4 formed on the inside of the chuck shank. The opposite end of the body is shaped to provide an outwardly extending bell-like flange 6 terminating in a thin cylindrical flange 7 concentric with the body of the shank. On the inside of flange 7 is formed a rabbet 8 slightly undercut as shown, the bottom 9 of the rabbet lying in a plane perpendicular to the long axis of the chuck and the side wall 11 of the rabbet lying in a conical surface concentric with the chuck axis. The bottom or larger diameter of this annular rabbet is slightly larger than the diameter of the head 12 of the stud and the smaller and top diameter of the annular rabbet is slightly smaller than the diameter of the stud head. The depth of the rabbet measured axially of the chuck is the same or slightly more than the thickness of the stud head. The inside edge of the flange 7 is shaped to provide a bevelled surface 13 to facilitate the entrance of the stud head into the socket provided by the rabbet.

The incomplete chuck shaped as above described is next milled or otherwise cut in one or more axial planes so that the kerfs 14 so formed divide the bell-like flange and a considerable portion of the body of the shank into a plurality of stiffly resilient arms 16 at the free end of each of which is a portion of a rabbet, the combined portions forming the complete circular rabbet in which the head of the stud is held. The parts are proportioned so that the stud head 12 may readily be placed in position on the end of the chuck and seated in the jaws by finger pressure. The tension of the jaws is sufficient to hold the stud while the shank portion 17 of the stud is being pushed through the insulation and during the welding of the end thereof to the backing wall. After the welding is completed, a small tipping movement of the welding machine is sufficient to release the chuck jaws from the head of the stud. A fresh stud may then be caught in the chuck and the cycle repeated.

I claim:

A chuck of the character described for holding the thin broad head of a stud including, a tubular body having one of its ends provided with a coupling and having its opposite end formed with a plurality of spaced axially extending slots therethrough so as to provide a plurality of resilient stud head-gripping fingers, each of the free ends of said fingers having on the inner surface thereof a radially extending rib and a forwardly facing shoulder, said rib comprising adjacent and oppositely inclined walls, the axially innermost of said inclined walls having its axially inner extremity terminating at the radially outer extremity of the forwardly facing internal shoulder which latter is formed on and extends substantially at right angles to the axis of the bore of the body, the inclined walls and shoulder of each finger being alined and cooperating with the respective walls and shoulder of the next adjacent finger, whereby when the head of the stud is moved inwardly of the free ends of the fingers past the outermost of the inclined walls and into engagement with the innermost of said inclined walls, the resiliency of the fingers will cause the innermost inclined wall to constantly urge the stud head against said shoulder so as to thereby maintain said stud firmly within the tubular body.

TED NELSON.